(12) United States Patent
Fink (10) Patent No.: US 11,693,861 B2
(45) Date of Patent: Jul. 4, 2023

(54) SYSTEMS AND METHODS FOR PROVIDING DATA-DRIVEN EVOLUTION OF ARBITRARY DATA STRUCTURES

(71) Applicant: Cognizant Technology Solutions U.S. Corporation, College Station, TX (US)

(72) Inventor: Daniel E. Fink, Berkeley, CA (US)

(73) Assignee: Cognizant Technology Solutions U.S. Corportion, College Station, TX (US)

( * ) Notice: Subject to any disclaimer, the term of this patent is extended or adjusted under 35 U.S.C. 154(b) by 6 days.

(21) Appl. No.: 17/368,822

(22) Filed: Jul. 6, 2021

(65) Prior Publication Data

US 2021/0334285 A1 Oct. 28, 2021

Related U.S. Application Data (62) Division of application No. 16/502,439, filed on Jul. 3, 2019, now Pat. No. 11,093,503.

(60) Provisional application No. 62/694,194, filed on Jul. 5, 2018.

(51) Int. Cl.
  *G06F 16/2455* (2019.01)
  *G06F 16/22* (2019.01)
  *G06F 21/60* (2013.01)

(52) U.S. Cl.
  CPC .... *G06F 16/24558* (2019.01); *G06F 16/2246* (2019.01); *G06F 21/60* (2013.01)

(58) Field of Classification Search
  CPC ........................ G06F 16/2246; G06F 16/24558
  USPC ......................................................... 707/755
  See application file for complete search history.

(56) References Cited

U.S. PATENT DOCUMENTS

| | | | |
|---|---|---|---|
| 8,909,470 B2 | 12/2014 | Hodjat et al. | |
| 8,909,570 B1 | 12/2014 | Hodjat | |
| 2005/0004942 A1* | 1/2005 | Madsen | H04L 41/0893 |
| 2017/0192638 A1 | 7/2017 | Iscoe et al. | |
| 2017/0193366 A1 | 7/2017 | Miikkulainen et al. | |
| 2017/0193367 A1 | 7/2017 | Miikkulainen et al. | |
| 2017/0193403 A1 | 7/2017 | Iscoe et al. | |
| 2020/0012648 A1* | 1/2020 | Fink | G06N 3/126 |

OTHER PUBLICATIONS

U.S. Appl. No. 16/424,686, filed May 26, 2019.

(Continued)

*Primary Examiner* — Hung T Vy
(74) *Attorney, Agent, or Firm* — Dawn-Marie Bey; Bey & Cotropia PLLC (57) ABSTRACT

A system and process for generalizing an evolutionary process applied to a particular domain involving different problems includes a researcher module for generating a configuration specification applicable to a particular problem. An evolution module parses the configuration specification into a representative tree structure, assembles policies for each node in the tree structure, and generates candidate genomes using the policies for each node in the tree structure. The policies may be applied to new data or data from prior runs to generate candidate genomes. The evolution module translates internal representations of the generated candidate genomes into known representations of the candidate genome for evaluation in accordance with the particular domain parameters by a candidate evaluation module.

7 Claims, 5 Drawing Sheets

HIGH LEVEL ARCHITECTURE (56) References Cited

OTHER PUBLICATIONS

Golovin, et al., (2017), "Google Vizier: A Service for Black-Box Optimization," Proceedings of the $23^{rd}$ ACM SIGKDD International Conference on Knowledge Discovery and Data Mining, pp. 1487-1495.
Liang, et al., (2018), "Evolutionary Architecture Search for Deep Multitask Networks," arXiv: 1803.03745.
Meyerson, et al., (2018), "Pseudo-task Augmentation: From Deep Multitask Learning to Intratask Sharing—and Back," arXiv: 1803.04062.
Rawal, et al., (2018), "From Nodes to Networks: Evolving Recurrent Neural Networks," arXiv: 1803.04439.
Zhang, et al., (2011), "Evolutionary Computation Meets Machine Learning: A Survey," IEEE Computational Intelligence Magazine, vol. 6, No. 4, DOI 10.1109/MCI.2011.942584.
Bergstra, et al., (2013), "Hyperopt: A Python Library for Optimizing the Hyperparameters of Machine Learning Algorithms," Proceedings of the $12^{th}$ Python in Science Conference (SCIPY 2013).

\* cited by examiner

HIGH LEVEL ARCHITECTURE

FIG. 1

EVOLUTIONARY COMPUTATIONS

```
{
    "version": "2017-06-27",
    "treatmentId": "default",
    "traits": {
      "category1": {
        "id": 13,
        "experimentId": 34,
        "candidateId": 9,
        "generationId": 4,
        "genes": {
          "algorithm": "BAYES",
          "seedLambda": 0.5,
          "seedShrinkage": 0.5,
          "multiSeedLambda": 0.5,
          "brandKernelWeight": 2,
          "colorKernelWeight": 2,
          "entropyNumSamples": 500,
          "brandSeedShrinkage": 0.5,
          "colorSeedShrinkage": 0.5,
          "multiSeedShrinkage": 0.5,
          "productShrinkFactor": 0.5,
          "entropyNumIterations": 50,
          "hideDisplayedProducts": true
        }
      }
    },
    "environment": {
      "client": "internal",
      "name": "aware2",
      "categories": {
        "category1": {
          "apiUrl": "https://example-api-endpoint/v1"
        }
      },
      "reportingUrl": "https://reporting-api-endpoint/v1",
      "currentCategory": "category1"
    },
    "features": {              310
        "hideCTA": true
    },
    "scriptUrls": [            216
        "https://static.sentientawareapi.com/2.0.1/dlls/polyfills.dll.js",
        "https://static.sentientawareapi.com/2.0.1/dlls/vendor.dll.js",
        "https://static.sentientawareapi.com/2.0.1/dlls/sdk.dll.js",
        "https://static.sentientawareapi.com/customizations/3.0.0/dlls/default/customizations.dll.js",
        "https://static.sentientawareapi.com/2.0.1/browser/sentient-bootstrapped.min.js"
    ]
}
```

SYSTEMS AND METHODS FOR PROVIDING DATA-DRIVEN EVOLUTION OF ARBITRARY DATA STRUCTURES

CROSS-REFERENCE TO RELATED APPLICATIONS

The present application is a division of U.S. patent application Ser. No. 16/502,439 entitled "Systems and Methods For Providing Data-Driven Evolution of Arbitrary Data Structures," filed Jul. 3, 2019, which claims the benefit of priority to U.S. Provisional Patent Application No. 62/694,194 entitled "Systems and Methods For Providing Data-Driven Evolution of Arbitrary Data Structures," filed Jul. 5, 2018, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Researchers create their own distinct and specialized programs for the pieces of their research domains that require it. This ad hoc approach is sufficient to solve a single problem, but such methods often lack the ability to retarget the evolutionary approaches to a different problem.

The present embodiments address the difficulty of establishing a generic system/service/library which is capable of evolving in a completely generic and potentially secure manner, the genetic material/models on behalf of many disparate yet specific optimization domains, each with their own genetic material/model limitations and data sets against which those evolved models are optimized.

BRIEF SUMMARY OF THE EMBODIMENTS

In many problem domains that use evolution, the evolved representation(s) can be described in whole or in part by simple data structures consisting of semantically independent scalar fields (floating point/integer numbers with ranges, Booleans, choices among enumerated sets), lists, and nested structures. The present embodiments facilitate specifying as input data descriptions of the bounds for evolution for each of these data elements in a single unified form, and allows potentially multiple specifications to be used within the same evolved representation.

The embodiments disclosed herein address issues that formally were not addressable in a generalized manner, including:

1. The problem of writing and rewriting specialized code for performing evolution for specific problem domains.

2. The enabling of the ability to drop in evolution of such data structures as a component into larger problems that in themselves have higher level semantics in their data structures.

3. The ability to easily change the dimensionality and representational complexity of the search space as configuration rather than compiled code.

4. The ability to ensure that each leaf scalar field of an arbitrarily nested structure has potentially equal probability to be modified by crossover and mutation operations.

All of these contribute to the ability to represent common problems in coding across domains to which it is applied. That is, it facilitates representing many search-spaces in a uniform way, which in turn facilitates applying many methods of evolution to the same problem. This is novel because evolution is not usually applied in this manner: there is no "interlingua" of representations in the prior art, instead there are multiple one-to-one mappings from methods to domains.

The disclosed embodiments make it possible to separate domains from methods through a generalization of evolvable data structures, which in turn makes it possible to build new evolutionary computation (EC) experiments and applications without reimplementation and to do so more quickly, which in turn makes it possible to industrialize EC experiments and applications.

In a first exemplary embodiment, a method for evolutionary optimization in a desired domain, includes: providing, by a researcher module, a configuration specification to an evolution module; receiving at the researcher module from the evolution module a plurality of genomes created in dependence upon the configuration specification, wherein the configuration specification identifies a first nested hierarchy of configuration nodes, the first hierarchy including a root node and one or more further nodes, the further nodes identifying leaf nodes; wherein the root node identifies a key-value pair, the value of the root node identifying a data structure which identifies one or more of the further nodes; and wherein one of the further nodes identifies a first key-value pair in which the value is selected from the group consisting of a scalar, a Boolean, a number, an enumeration of discrete choices, a data type identifier, and a further data structure which identifies one or more of still further nodes.

In a second exemplary embodiment, a method for evolutionary optimization in a desired domain includes: receiving by an evolution module from a researcher module a configuration specification; parsing the configuration specification by the evolution module into a tree structure of specific coded data structures; generating a policy assembly using the parsed tree structure of specific coded data structures to produce a representation tree of reproduction policy structures, wherein each instance of the reproduction policy structures represents one of a single leaf node or branch node in the representation tree; creating by the evolution module an internal representation of a candidate genome in accordance with the representation tree of reproduction policy structures, wherein the reproduction policy structures are data-type specific; translating by the evolution module the internal representation of the candidate genome to a known representation of the candidate genome, wherein the known representation of the candidate genome is known to a candidate evaluation module; and providing the known representation of the candidate genome to the candidate evaluation module for fitness evaluation in the desired domain.

In a third exemplary embodiment, an evolution module for generating populations of candidate genomes for evaluation by an independent candidate evaluation module in a specific domain, includes: a parser module for receiving a configuration specification from a research module, parsing the configuration specification into a tree structure of specific coded data structures, and generating a policy assembly using the parsed tree structure of specific coded data structures to produce a representation tree of reproduction policy structures, wherein each instance of the reproduction policy structures represents one of a single leaf node or branch node in the representation tree; and further wherein the configuration specification is indicative of a known candidate genome representation that is recognizable to the independent candidate evaluation module; and a population initialization module for initiating the creation of an internal representation of a candidate genome in accordance with the representation tree of reproduction policy structures, wherein the reproduction policy structures are data-type specific; wherein the evolution module translates the internal representation of the candidate genome to the known representation of the candidate genome and provides the known representation of the candidate genome to the candidate evaluation module for fitness evaluation in the specific domain.

BRIEF DESCRIPTION OF FIGURES

The invention will be described with respect to specific embodiments thereof, and reference will be made to the drawings, in which.

DETAILED DESCRIPTION

The embodiments herein support segmented security between domain-specific data sets being evaluated which is not transmitted to the Evolution (Web) Service. This enables customers with secure data sets to optimize models that predict on those data sets to use evolution securely, while obtaining a population of potentially optimal models to evaluate in their own fashion.

The embodiments also allow data and code details of Evolution module implementation to remain secure from entities using the service, thus protecting intellectual property of the implementers.

Figure 1:
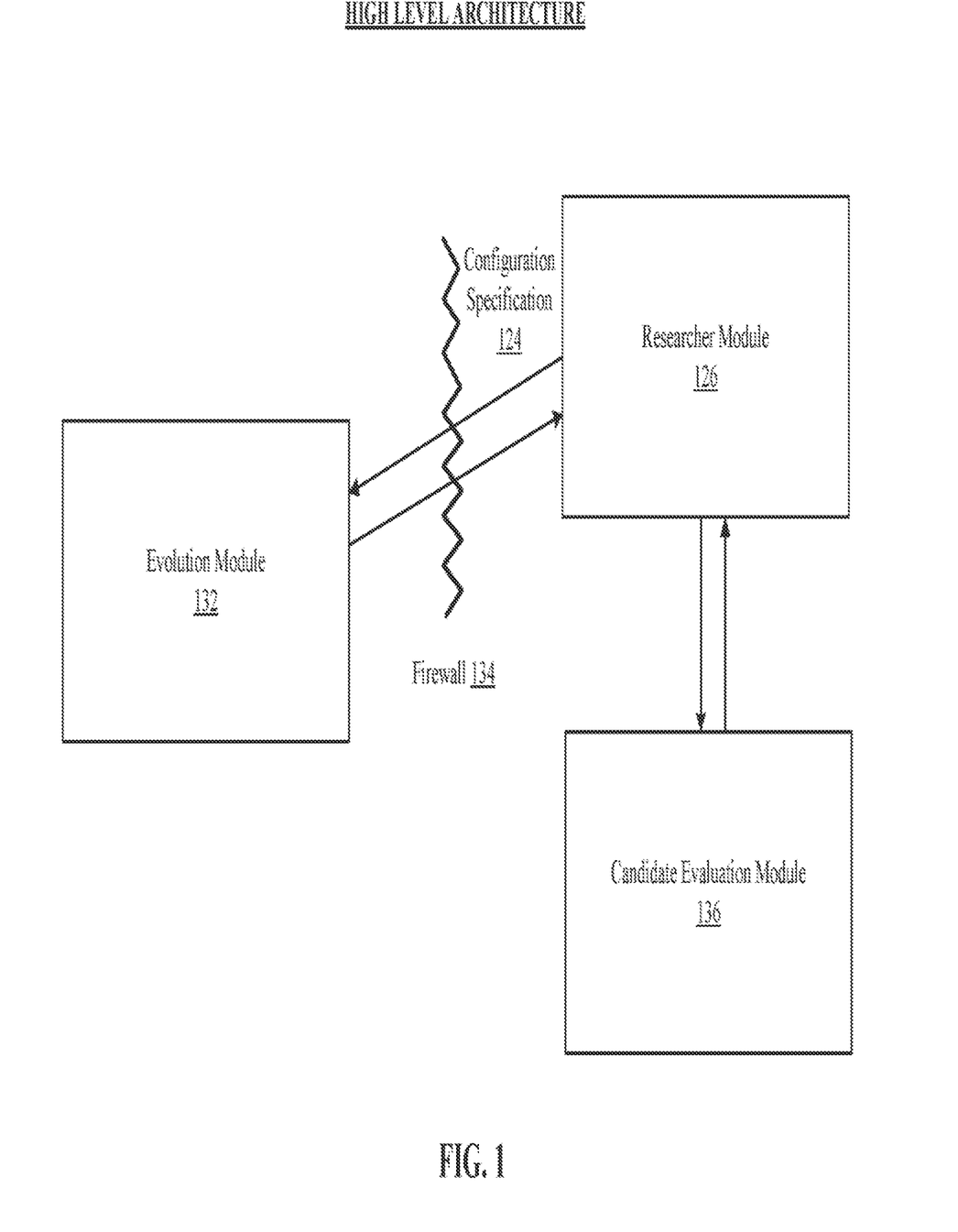
FIG. 1 is a high level architecture of the embodiments described herein.

Referring to FIG. 1, the system comprises three primary components: a Researcher module 126, an Evolution module 132 and a Candidate evaluation module (also known as an Experiment Host) 136.

Researcher Module

The Researcher module (RM) 126 generates a configuration specification 124 using the evolvable parameter specification discussed below. The configuration specification 124 generated by RM 126 is sent to the Evolution module 132 which is operating behind a firewall 134. The RM 126 generates a configuration specification 124 for a particular domain for which candidate individuals (or candidate genomes) are to be generated. Individuals in a particular domain are evaluated using a particular fitness function for that domain. More than one fitness functions can be used to evaluate individuals in a particular domain. Additionally, the multiple fitness functions can evaluate the candidate individuals using different criteria including novelty and diversification etc. In an exemplary implementation, a RM 126 uses rules described in the following exemplary JSON specification to generate the configuration specification 124. The configuration specification can be generated manually or automatically by using the defined rules.

By way of particular example, in various places throughout the configuration files, it is possible to specify a JSON string that describes schema for structures that will be present in some portion of the evolved output. Take an embodiment in which it is a neural network that is being evolved via an ENN service and there are two places where the configuration specifications come into play. The first is specification of global hyperparameters and the second is specification of layer parameters to be used within the neural network. The purpose of the JSON (or other appropriate format known to those skilled in the relevant art) string/file is to specify the fields and types that the ENN service should be evolving. By way of example only, to generate a dictionary of evolved global hyperparameters as follows:

```
{
    "learning_rate": 0.0005,
    "optimizer": "SGD"
}
```

A corresponding JSON specification might look as follows:

```
{
    "type": {
        "learning_rate": {
            "type": "Double",
            "lowerBound": 1e-4,
            "upperBound": 1e-3,
            "scale": "log"
        },
        "optimizer": {
            "type": "String",
            "choice": [ "Adam", "SGD" ]
        }
    }
}
```

Each JSON specification has a top-level **\*\*_type_\*\*** entry which tells the system to expect a type definition of an object/structure. The top-level JSON object sent to the ENN Service is a structure and thus must have a type entry.

Each field specification has as its key the name of the field that the user wishes to see returned if the field were in a dictionary. The value associated with the field name key is itself another JSON object which contains the **\*\*_type_\*\* definition of the field. Examples include: scalar types, Boolean types, numeric types, ranges, discrete choices, string types and nested structures. For scalar types, double, float, integer, Boolean and string may be supported in the structure for valid values of the \*\* type_\*\*** field. For integer, double and float types, each entry can express a range of possibilities for an independent variable via a lowerBound and upperBound specification field. Scales can be specified as linear or log. Numeric types provide the possibility of picking from a number of discrete choices via the choice specification. And it is also possible to specify nested structures of data. For example, to express that your dictionary looks like this:

```
{
    "optimizer": "SGD",
    "opt_params": {
        "learning_rate": 0.0005
    }
}
``` the value of the **\*\*_type_\*\*** field in the JSON specification can be another JSON structure with more structure definition instead of a string describing a scalar type. An example of the JSON specification for the nested structure above is as follows:

```
{
  "type": {
    "optimizer": {
      "type": "String",
      "choice": [ "Adam", "SGD" ]
    },
    "opt_params": {
      "type": {
        "learning_rate": {
          "type" : "Double",
          "lowerBound": 1e-4,
          "upperBound": 1e-3,
          "scale": "log"
        }
      }
    }
  }
}
```

Example layer_parameters JSON spec

```
{
  'type': {
    'Conv2D' : {
      'type' : {
        'filters' : {
          'type' : 'Integer',
          'lowerBound': 16,
          'upperBound' : 96,
          'scale': 'log'
        },
        'kernel_size' : {
          'type' : 'Integer',
          'choice' : [ 1, 3 ]
        },
        'activation' : {
          'type' : 'String',
          'choice': [ 'relu', 'linear', 'elu', 'selu' ]
        },
        'kernel_initializer' : {
          'type' : 'String',
          'choice': [ 'glorot_normal', 'he_normal',
                      'glorot_uniform', 'he_uniform' ]
        },
        'kernel_regularizer' : {
          'type' : {
            'regularizer' : {
              'type' : 'String',
              'choice': [ 'l2' ]
            },
            'penalty' : {
              'type' : 'Double',
              'lowerBound' : 1e-9,
              'upperBound' : 1e-3,
              'scale': 'log'
            }
          }
        },
        'padding' : {
          'type' : 'String',
          'choice': [ 'same' ]
        }
      }
    },
    'Dropout' : [
      'type' : {
        'rate' : {
          'type' : 'Double',
          'lowerBound': 0.0,
          'upperBound' : 0.7,
          'scale': 'linear'
        }
      }
    ]
  }
}
```

Evolution Module

The Evolution module 132 is responsible for:

a) Accepting configuration specification information regarding the constraints of Evolution from the Candidate evaluation module 136.

b) Creating new populations of possible optimizations from no prior candidates.

c) Creating new populations from previous populations of priors, based on fitness data for each prior candidate d) Securely reading/writing checkpoints of hidden representation representing evolution state, so that such state can be resumed at any point in the future, only by the Evolution module 132. Such state can be associated with an insecure key which is shared with the Candidate evaluation module 136.

e) Providing translations/interpretations of any new candidates generated by the Evolution module 132 in a representation such that the Candidate evaluation module 136 knows what to do with the candidates once it gets them.

f) Assignment of unique identifiers for each of the candidates ("candidate ID").

The Evolution module performs evolutionary competition and procreation using any desired mechanism. In some examples, competition and procreation are performed using techniques set forth in one or more of the following: U.S. Pat. No. 8,909,570; U.S. Patent Publication No. 2017/0193403; U.S. Patent Publication No. 2017/0192638; U.S. Patent Publication No. 2017/0193366; U.S. Patent Publication No. 2017/0193367 and U.S. patent application Ser. No. 16/424,686 entitled Systems and Methods for Providing Secure Evolution as a Service filed May 26, 2019. These patents and patent publications are incorporated herein by reference.

A hierarchical data format is used as input to the system to describe the structure (or component structure) to be evolved (specific format itself does not matter, for example JSON, YAML, XML, would each suffice as long as the format supports hierarchical data descriptions). While the notion of this data format is an aspect of the embodiments, it is merely a conduit of information.

A format parser in the evolution module 132 digests the data description and creates hierarchies of policy objects representing the evolutionary characteristics of the desired data structure. These policy objects can include (1) specific creation, mutation, crossover, and simplex operations for the hierarchy of components of the specified data structure and/or (2) specific interpreters of random number streams into the various scalar fields at their appointed places in the specified data hierarchy. Specifically, there exists a single set of genetic operations and/or interpreters for each component field type, e.g., floating point numbers, integers, Booleans, sets of choices of enumerated strings, fixed or evolved-sized lists, nested data structures, or any combination thereof, that are for the various data types specified within the structure, but reused with different parameter/boundary specifications for each specified field. This arrangement of policy objects is used within a standard theoretical evolution loop of population Generation/Evaluation/Selection in the Generation phase, where structures are created either from scratch or from a previous generation of candidates.

Consider the JSON specification for evolved material below:

```
{
    "type": {
        "nested": {
            "type": {
                "probability": {
                    "type": "Double"
                    "lowerBound": 0.0,
                    "upperBound": 1.0,
                    "precision": 0.05
                },
                "imageSize" : {
                    "type": "Integer",
                    "choice": [ 128, 256, 1024]
                }
            },
            "fieldChangeRate": 0.6
        },
        "complete": {
            "type": "Boolean"
        }
    },
    "fieldChangeRate": 0.3
}
```

This specifies the bounds of a small, fixed structure an instance of which would look like this:

```
{
    "nested": {
        "probability": 0.45,
        "imageSize": 256
    },
    "complete" : True
}
```

In Step 1, a parsing step changes the data specification into a tree structure of specific coded data structures associated with their base types (Float, Integer, Boolean, String, List, Structure, for instance) with the outermost nested structure as the root. Such data structures contain the boundary/limits information for each field as well as references to any other data structures required for sub-fields (in the case of nested structures, or arbitrary length lists). Each structure refers to the name of the field as its key and its data type from the data specification entry to which it corresponds. All other data is fixed, but type-specific (for instance, boundary parameters are different for floats than for Booleans).

In Step 2, a policy assembly step takes the coded specification structures from the parsing step as input and assembles a similarly shaped tree of reproduction policy structures which operate on raw input data of previously evaluated/seeded candidates (or creates such candidates from randomness). Each instance of these policy structures represents a single leaf node (for scalar fields) or branch node (for lists or nested structures) in the representation tree. Implementations of reproduction policy nodes:

a) are data-type specific (different implementations for float than for Boolean than for list)

b) can be either i. sets of data-type-specific reproduction operations themselves, containing various creation/mutation/crossover/simplex operations that operate directly on parent genetic material data structures (created by the same process) as inputs; or ii. Interpretive operations of lists of random floating point and integer numbers which also represent the underlying genetic material, in a way that may be less human-readable, but more efficient for machine interpretation.

In the evolution loop at Step 3, during the generation/reproduction phase, the policy assembly from Step 2 is referenced either:

a) for each set of 0-N parents that are contributing to a new offspring in the case of Step 2 node (b)(i) in the policy assembly; or b) for each genetic material representation to be interpreted in the case of Step 2 node (b)(ii) in the policy assembly. In either case, the policy assembly creates a single new candidate in the specified representation by creating a dictionary mapping of field name as a key (from the specification data) to field value (from the policy assembly).

In Step 4, the policy assembly is referenced repeatedly, with different genetic material input, until a full population of new candidates is created for evaluation and later selection within the evolution loop.

As described above, some implementation variations include policy assemblies of genetic operators Step 2 (b)(i) or genetic material interpreters Step 2 (b)(ii). The system could be extended to reference other opaque types or similar structures with their own evolutionary semantics, such as graphs. The system could be combined with a separate policy which verifies the semantic integrity of candidates which are generated and rejects candidates that do not conform, thus creating space in the population for candidates that do conform without the expense of evaluating these malformed candidates. This would include data representations where values of leaf scalar fields (float, Boolean, etc.) are not entirely independent from their peers.

The embodiments described herein can be used as the entire representation generation system for domains in which the population can be fully specified by nested tree structures.

The embodiments described herein can be used as a partial representation generation system for domains whose representations have other more complex semantics associated with their representations. For instance, this may be used as a component in an Evolutionary Neural Network (ENN) system, which generates topologies for neural network architectures. The topological aspect of the representation has its own semantics, but each node in the system has its own parameters which can be specified by arbitrary structures generated by an aspect of the present embodiments, as well as structures describing global hyperparameters for the evaluation of the neural networks. All of these elements can be combined into a complex representation which defined a single candidate for evaluation.

The following computer program code presents example parser logic to generate data type specific reproduction policies for the nodes as described in Step 2(a) above.

| Direct-Reproduction Suites |
| --- |

1. BooleanOperatorSuite.Java
    1. package ai.sentient.ea.toolkit.policy.reproduction.primitives;
    2.
    3. import java.util.Random;
    4.
    5. import ai.sentient.ea.toolkit.data.primitives.EvoledParameter;
    6.
    7. public final class BooleanOperatorSuite
    8.      extends OperatorSuite<Boolean> {
    9.
    10.
    11.     public BooleanOperatorSuite(final Random random,
    12.         final EvolvedParameter<Boolean> evolvedBooleanSpec)
    {
    13.
    14.         super(evolvedBooleanSpec);
    15.         this.defaultRegistration(random);
    16.     }
    17.
    18.
    19.
    20.     private void defaultRegistration(final Random random) {
    21.
    22.         register(new BooleanCreator(random));
    23.
    24.         register(new BooleanComplementMutator( ));
    25.
    26.         register(new PickOneCrossover<Boolean>random));
    27.     }
    28. }
2. NumberOperatorSuite.Java
    1. package ai.sentient.ea.toolkit.policy.reproduction.primitives;
    2.
    3. import java.util.Random;
    4.
    5. import ai.sentient.ea.toolkit.data.primitives.EvolvedNumberPrimitive;
    6.
    7. public final class NumberOperatorSuite<Type extends Number & Comparable<Type>>
    8.      extends OperatorSuite<Type> {
    9.
    10.
    11.     public NumberOperatorSuite(final Random random,
    12.         final EvolvedNumberPrimitive<Type> evolvedNumberSpec) {
    13.
    14.         super(evolvedNumberSpec);
    15.         this.defaultRegistration(random);
    16.     }
    17.
    18.
    19.
    20.     private void defaultPegistration(final Random random) {
    21.
    22.         final EvolvedNumberPrimitive<Type> evolvedNumberSpec =
    23.             this.getEvolvedNumberSpec( );
    24.
    25.         register(new NumberCreator<Type>(random, evolvedNumberSpec));
    26.
    27.
    28.         register(new NumberJumpMutator<Type>(random, evolvedNumberSpec));
    29.
    30.
    31.         register(new NumberMidpointCrossover<Type>(evolvedNumberSpec));
    32.         register(new NumberOvershootCrossover<Type>(random, evolveNumberSpec));
    33.     }
    34.
    35.
    36.     /**
    37.      * @return the EvolvedNumberPrimitive used for this suite instance.
    38.      */
    39.     public EvolvedNumberPrimitive<Type> getEvolvedNumberSpec( ) {
    40.         return (EvolvedNumberPrimitive<Type>) this.getEvolvedParameterSpec( );

| Direct-Reproduction Suites |
|---|

```
        41.       }
        42.    }
  3. SetValueOperatorSuite.Java
        1. package ai.sentient.ea.toolkit.policy.reproduction.primitives;
        2.
        3. import java.util.ArrayList;
        4. import java.util.List;
        5. import java.util.Random;
        6. import java.util.Set;
        7.
        8. import ai.sentient.ea.toolkit.data.primitives.EvolveParameterSet;
        9.
       10.    public final class SetValueOperatorSuite<Type> extends
              OperatorSuite<Type> {
       11.
       12.        public SetValueOperatorSuite(final Random random,
       13. final EvolvedParameterSet<Type>
              evolvedSetSpec) {
       14.
       15.           super(evolvedSetSpec);
       16.           this.defaultRegistration(random);
       17.        }
       18.
       19.
       20.    private void defaultRegistration(final Random random) {
       21.
       22.           final EvolvedParameterSet<Type> evolvedSetSpec =
       23.              (EvolvedParameterSet<Type>)
              this.getEvolvedParameterSpec( );
       24.           Set<? extends Type> set = evolvedSetSpec.getTypeSet( );
       25.           List<Type> setList = new ArrayList< >(set);
       26.
       27.           // Create and register the Creators we will use.
       28.           register (new SetValueCreator<Type>(random, setList));
       29.
       30.              register(new SetValueMutator<Type>(random,
              setList));
       31.
       32.              register(new PickOneCrossover<Type>(random));
       33.        }
       34.    }
```

The following computer program code presents example interpreter logic to generate policies for the nodes as described in Step 2(b) above.
Copyright 2018, Sentient Technologies

| Interpretation Suites |
|---|

```
1. boolean_spec_gene_interpreter.py
from jsonspec.data.evolved_parameter_spec import EvolvedParameterSpec
from deepneat.jsonspec.policy.interpretation.spec_gene_interpreter import
SpecGeneInterpreter
"""""
SpecGeneInterpreter implementation that knows how to take lists of
reals and booleans from a DeepGene and interprets them into a single
boolean value, given a single EvolvedParameterSpec.
"""""
class BooleanSpecGeneInterpreter(SpecGeneInterpreter):
   def interpret_gene(self, spec, reals, booleans):
      """"""
      :param spec: Some subclass of EvolvedParameterSpec defining the
              data needed to interpret the object
      :param reals: a list of real numbers [0.0, 1.0] from the gene.
              If the interpretation uses reals, it is expected to use
              reals.pop( ) to get as many reals as it needs.
      :param booleans: a list of booleans from the gene.
              If the interpretation uses booleans, it is expected to
use
              booleans.pop( ) to get as many boolean values as it
needs.
```

| Interpretation Suites |
| --- |

```
        :return: An object, defined by the spec, whose values are
interpreted
                from the reals and binaries passed in
        """
        value = booleans.pop( )
        return value
2. number_gaussian_spec_gene_interpreter.py
import math
from jsonspec.data.evolved_number_primitive_spec import
EvolvedNumberPrimitiveSpec
from jsonspec.policy.parser.double_to_number import DoubleToNumber
from jsonspec.policy.parser.number range_gaussian_spec_json_parser import
NumberRangeGaussianSpecJsonParser
from deepneat.jsonspec.policy.interpretation.spec_gene_interpreter import
SpecGeneInterpreter
"""""
SpecGeneInterpreter implementation that knows how to take lists of
reals and booleans from a DeepGene and interprets them into a single
number value, given a single EvolvedNumberPrimitiveSpec.
"""""
class NumberGaussianSpecGeneInterpreter(SpecGeneInterpreter):
    def interpret gene(self, spec, reals, booleans):
        """""
        :param spec: Some subclass of EvolvedParameterSpec defining the
                data needed to interpret the object
        :param reals: a list of real numbers [0.0, 1.0] from the gene.
                If the interpretation uses reals, it is expected to use
                reals.pop( ) to get as many reals as it needs.
        :param booleans: a list of booleans from the gene.
                If the interpretation uses booleans, it is expected to
use
                booleans.pop( ) to get as many boolean values as it
needs.
        :return: An object, defined by the spec, whose values are
interpreted
                from the reals and binaries passed in
        """""
        if not isinstance(spec, EvolvedNumberPrimitiveSpec):
            raise ValueError("Given spec is not
EvolvedNumberPrimitiveSpec")
        alpha = reals.pop( )
        log = (spec.scaling_functions == \
            NumberRangeGaussianSpecJsonParser.LOG_SCALE)
        uncast_value = self._convert_between_range(alpha, spec.lower_bound,
                    spec.upper_bound,
log=log)
        caster = DoubleToNumber(spec.data_class)
        value = caster.cast_to_type(uncast_value)
        return value
    def _convert_between_range(self, alpha, start, end, log=False):
        assert 0 <= alpha <= 1;
        assert end >= start
        start = max(1e-12, start);
        end = max(1e-12, end)
        if not log:
            value = alpha * (end - start) + start
        else:
            value = math.exp(alpha * (math.log(end) - math.log(start)) + \
                    math.log(start))
        return value
3. set_spec_gene_interpreter.py
import math
from jsonspec.data.evolved_parameter_set_spec import
EvolvedParameterSetSpec
from deepneat.jsonspec.policy.interpretation.spec_gene_interpreter import
SpecGeneInterpreter
"""""
SpecGeneInterpreter implementation that knows how to take lists of
reals and booleans from a DeepGene and interprets them into a single
value chosen from a act of possible values, given in a single
EvolvedParameterSetSpec.
"""""
class SetSpecGeneInterpreter(SpecGeneInterpreter:
    def interpret_gene(self, spec, reals, booleans:
        """""
```

-continued

| Interpretation Suites |
| --- |

```
    :param spec: Some subclass of EvolvedParameterSpec defining the
            data needed to interpret the object
    :param reals: a list of real numbers [0.0, 1.0] from the gene.
        If the interpretation uses reals, it is expected to use
        reals.pop( ) to get as many reals as it needs.
    :param booleans: a list of booleans from the gene.
        If the interpretation uses booleans, it is expected to
use
        booleans.pop( ) to get as many boolean values as it
needs.
    :return: An object, defined by the spec, whose values are
interpreted
        from the reals and binaries passed in
    """
    if not isinstance(spec, EvolvedParameterSetSpec):
        raise ValueError("Given spec is not EvolvedParameterSetSpec")
    choices = list(spec.type_set)
    num_choices = len(choices)
    log_2_set_size = int(math.ceil(math.log(num_choices, 2)))
        int_size = log_2_set_size + 1
    uniform_int = 0
    for i in range (0, int_size):
        bit = booleans.pop( )
        uniform_int = uniform_int + (bit << i)
    index = uniform_int % num_choices
    value = choices[index]
    return value
```

Candidate Evaluation Module

The Candidate evaluation module 20 is responsible for:

a.) Initiating requests from the Evolution module 15 (with or without results from prior candidates, configuration updates, insecure checkpoint keys, etc.)

b.) Evaluating candidates against the secure data set (by a mechanism of its own choosing) such that enough measurements about the candidates can be taken to inform the creation of the next population.

In a specific exemplary implementation, the Researcher module makes calls into a library to request new candidates. Such an implementation may (or may not) include a firewall to provide obfuscation from the library, and elements of all modules can run in a single thread or in separate threads. At a high level the interaction between modules is similar to the evolution as a service (EaaS) implementation described below, though at a low level, inter-module communication may involve function calls rather than messaging. The EaaS implementation has overlapping features with those described in U.S. patent application Ser. No. 16/424,686 entitled Systems and Methods for Providing Secure Evolution as a Service filed May 26, 2019, which is incorporated herein by reference in its entirety.

In the EaaS example below, the Candidate evaluation module (CEM) 136 and the Evolution module (EM) 132 are run on two distinct hosts, each within its own secure environment. In another implementation Researcher module (RM) 126 is running on the same host as the CEM. In an alternative implementation, the RM 126 is running on a separate host from the CEM 136 and is outside the firewall 124. Communication between the CEM 136 and the EM 132 as well as between RM 126 and CEM 136 is limited to standard network traffic, over an (optionally encrypted) socket connection. Preferably the two hosts are physically distinct as described above, but in an alternative embodiment they may be different virtual machines sharing a common physical computer platform.

The technology disclosed is applicable to all examples of evolutionary algorithms and services presented in the incorporated applications and papers listed above among many other types of evolutionary algorithms and services.

Exemplary embodiments of the technology disclosed are presented below using FIGS. 1 through 5.

FIG. 1 shows a high level architecture of an example implementation of the technology disclosed. It includes three module: an evolution module 132, a researcher module 126 and a candidate evaluation module 136 also referred to as an experiment host. The modules 132, 126 and 136 run on physically distinct hosts. The firewall 134 is symbolic since it is created by aspects of the invention. Conventional firewalls, of course, can be present as well. In another embodiment, the researcher module 126 and candidate evaluation module 136 operate on the same host.

The module 126 communicates with the module 132 via connection using standard network traffic. Similarly, module 126 communicates with the module 136 using standard network traffic There can be one or more intermediary devices such as a content delivery network (CON) positioned between the evolution module 132 and the candidate evaluation module 136 and the researcher module 126. In one embodiment, the CON is positioned on the same side of the firewall as the researcher module 126. In another embodiment, the candidate evaluation module 132 is positioned on the same side as the evolution module 132. In yet another embodiment, parts of the CON are positioned on both sides of the firewall 134. The researcher module 126 initiates the evolution process by sending a configuration specification 124 to the evolution module 132 behind the firewall 134. Following the creation of new population of candidate genomes, the evolution module sends the candidate genomes to the candidate evaluation module 136 via the researcher module 126 and receives their respective fitness scores.

Figure 2:
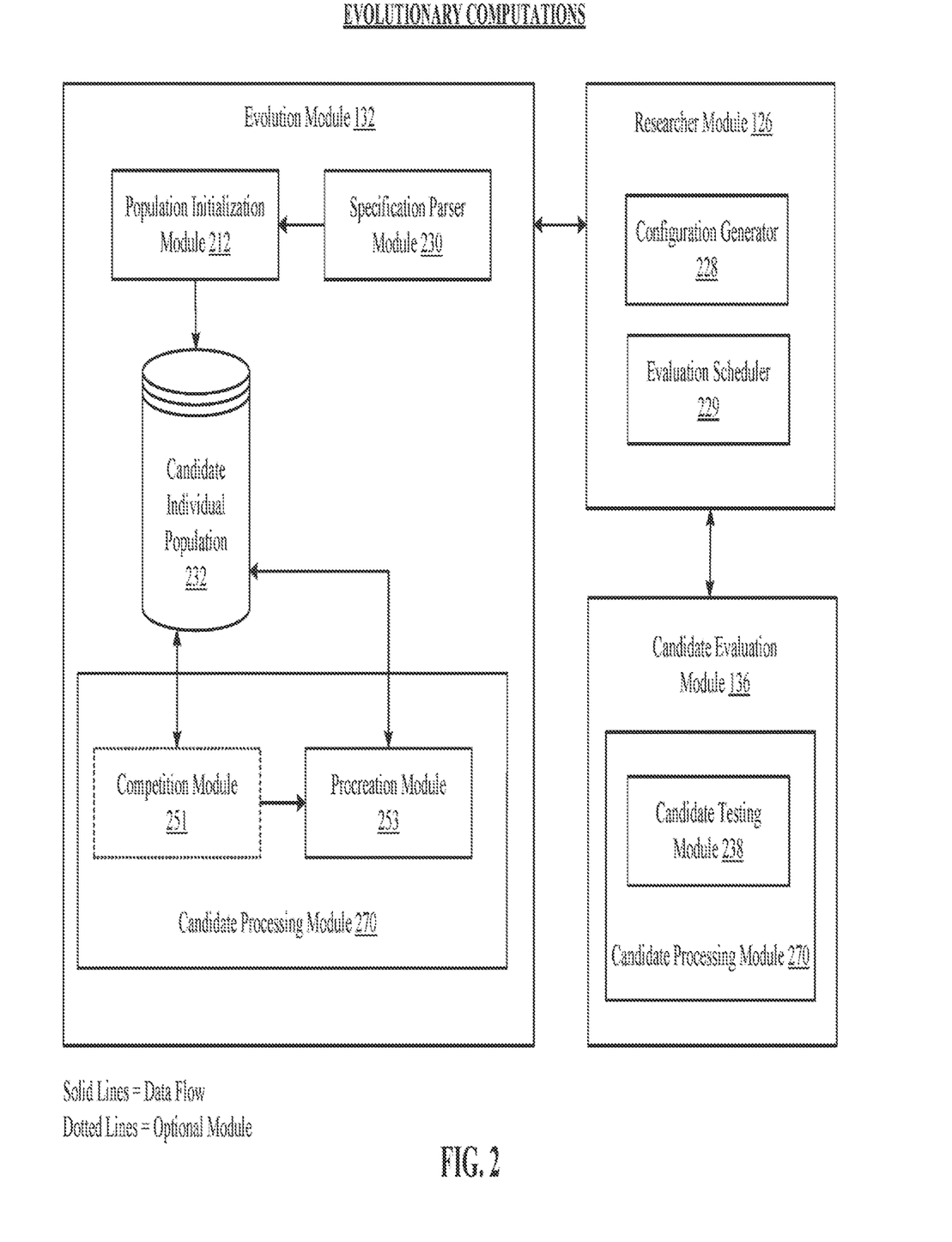
FIG. 2 illustrates an exemplary modules configuration which can be used to implement one or more embodiments herein.

FIG. 2 illustrates modules that can be used to implement the evolution module 132 and candidate evaluation module 136. The modules in FIG. 2 can be implemented in hardware or software, and need not be divided up in precisely the same blocks as shown in FIG. 2. Some of the modules can also be implemented on different processors or computers, or spread among a number of different processors or computers. In addition, it will be appreciated that some of the modules can be combined, operated in parallel or in a different sequence than that shown in FIG. 2 without affecting the functions achieved. Also as used herein, the term "module" can include "sub-modules", which themselves can be considered herein to constitute modules. In particular, candidate testing module 238, competition module 251, and procreation module 253 are also considered herein to be sub-modules of a candidate processing module 270. The competition module 251 is shown by a dotted line as it is optional in the candidate processing module 270. In another embodiment, the competition module 251 is part of the candidate evaluation module 136. Note that candidate testing module 238 is part of candidate evaluation module 136 running on a separate host from the evolution module 132 as described above. The blocks in FIG. 2, designated as modules, can also be thought of as flowchart steps in a method. A module also need not necessarily have all its code disposed contiguously in memory; some parts of the code can be separated from other parts of the code with code from other modules or other functions disposed in between.

Referring to FIG. 2, the researcher module 126 generates a configuration specification using the configuration generator module 228. The configuration specification is sent to the specification parser module 230 of the evolution module 132. The specification parser module 230 parses the configuration specification and assembles policies for each node in the tree structure generated. The candidate individual population 232 is initialized by a population initialization module 212, using the policies for each node in the tree structure. It writes a preliminary pool of candidate individuals in the population 102. The preliminary pool can be created randomly, or in some embodiments, a priori knowledge can be used to seed the first generation. In another embodiment, candidate individuals from prior runs can be borrowed to seed a new run. At the start, all candidate individuals are initialized with performance measures 106 that are indicated as undefined. The population initialization module 202 also defines a candidate search space. As used herein, the term "candidate search space" refers to a space having M dimensions, where each dimension represents an axis along which different candidate individuals can have different values. The size of the space in each dimension is equal to the range of values available for that dimension. The candidate evaluation module 136 receives information from evolution module 132 through the researcher module 126 via an evaluation scheduler module 229. In one implementation, the operation of each of the module shown in FIG. 2 is described in the U.S. Nonprovisional application Ser. No. 15/399,450 incorporated by reference herein.

Let us consider the application of the technology to e-commerce. In e-commerce, designing user experiences, i.e., webpages and interactions, which convert as many users as possible from casual browsers to paying customers is an important goal. While there are some well-known design principles, including simplicity and consistency, there are also often unexpected interactions between elements of the webpage that determine how well it converts. The same element may work well in one context but not in others. It is often hard to predict the result, and even harder to decide how to improve a given webpage. A website host running a candidate evaluation module 136 may employ a website modification service like Sentient Technologies™ running as evolution module 132 to provide a presentation of its webpages that maximizes conversion.

Figure 3:
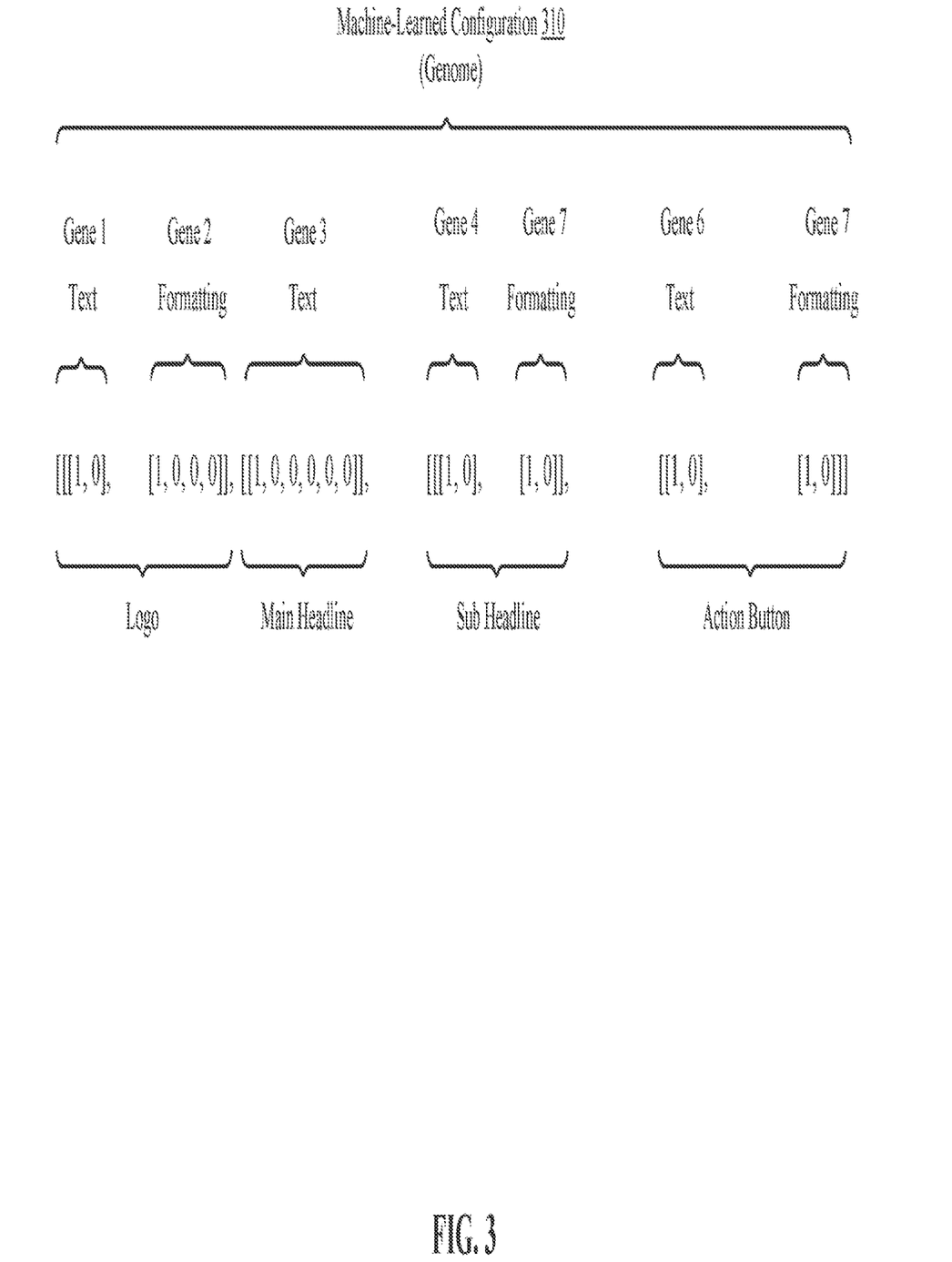
FIG. 3 illustrates an exemplary first candidate format in accordance with one or more embodiments herein.
Figure 4:
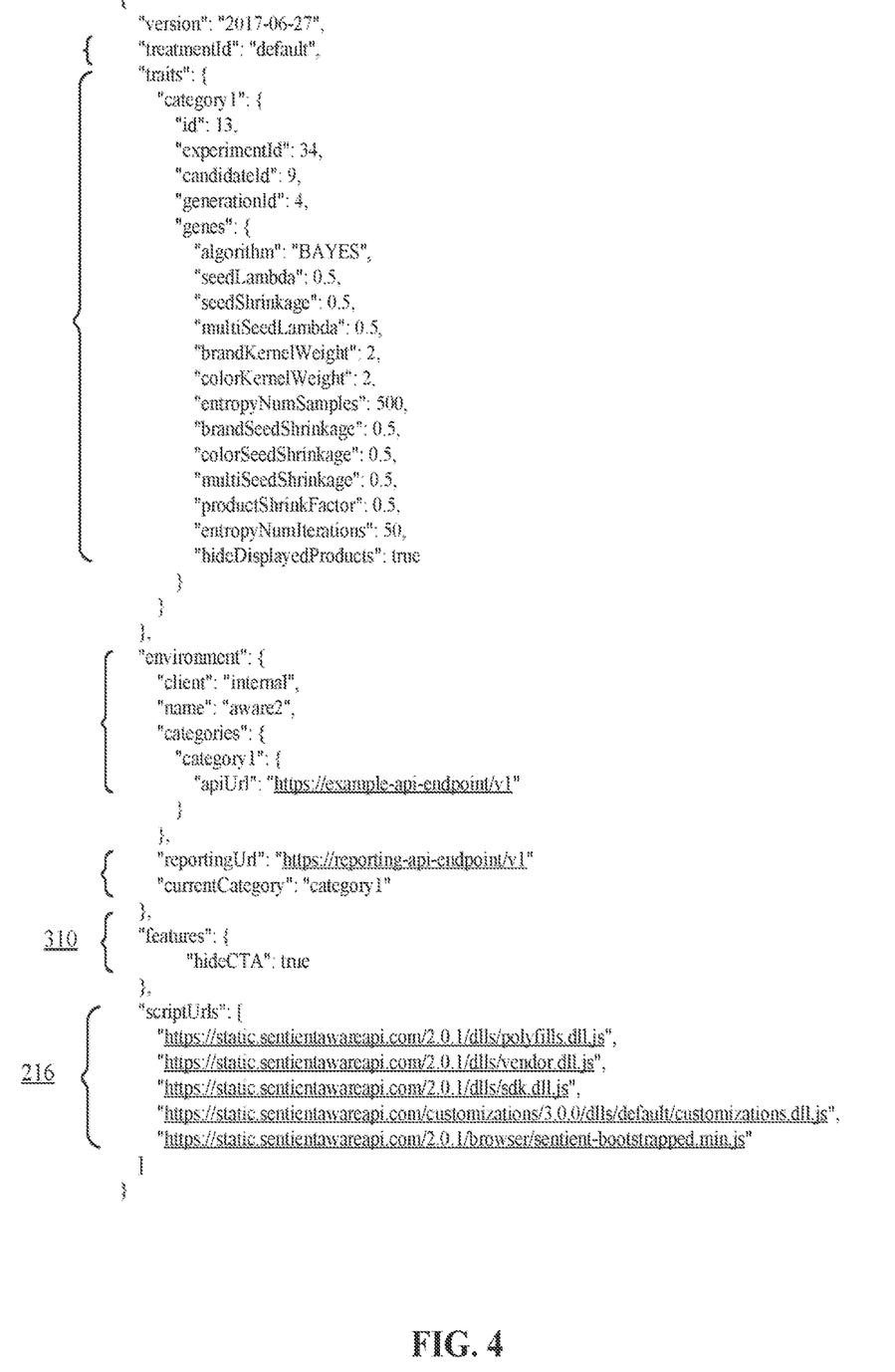
FIG. 4 illustrates an exemplary second candidate format in accordance with one or more embodiments herein.

In a first embodiment, the individual is in a "coded" form as shown in FIG. 3. The candidate evaluation module converts the individual from coded form to a form "useful" for its purposes. For example, if the purpose is to evolve better web funnels, the coded form may be like FIG. 3 and the useful form can be as shown in FIG. 4. The candidate evolution system 132 transmits the individual 310 to candidate evaluation module 136 as shown in FIG. 3 via the researcher module 126. Continuing with the example of webpage evaluation, consider a webpage has four elements: logo, main headline, sub headline, and action button. Each element has corresponding dimensions. For example, logo has two dimensions: logo text and logo formatting. Dimensions have corresponding rendering values for example, logo text has two rendering values: control value and value 1. As shown in FIG. 3, an individual encode the rendering values in a binary sequence called a genome, which is further compartmentalized into subsequences called genes.

FIG. 3 illustrates that each individual can represent a dimension of an element of a webpage and encode rendering values corresponding to the dimension. For each gene, only one of the bits can be active or hot (e.g., represented by 1) so as to identify a particular rendering value from a set of available rendering values. The leftmost bit can represent the control value of an individual, which, in one example, for main headline might indicate plain text. The second, third, and forth bits might, for example, indicate bold text, italics text, and bold underlined text, respectively. It will be appreciated that many other encodings are possible. For example, a two-bit numeric value might be used, with 0 indicating plain text, 1 indicating bold text, 2 indicating italics text, and 3 indicating bold underlined text.

In a second embodiment, the individual is sent through the firewall in a "useful" form as shown in FIG. 4. As described above in the first embodiment, the individual is transmitted through the firewall 134 in an encrypted form. This is one example of the individual of FIG. 2 in a JavaScript Object Notation (JSON) format 300. In JSON code 300, the additional scripts 216 are identified as "scriptUrls", which further contains links to five scripts. These scripts, when executed by the client, generate the updated interface version of the portion of the webpage, as discussed above.

Figure 5:
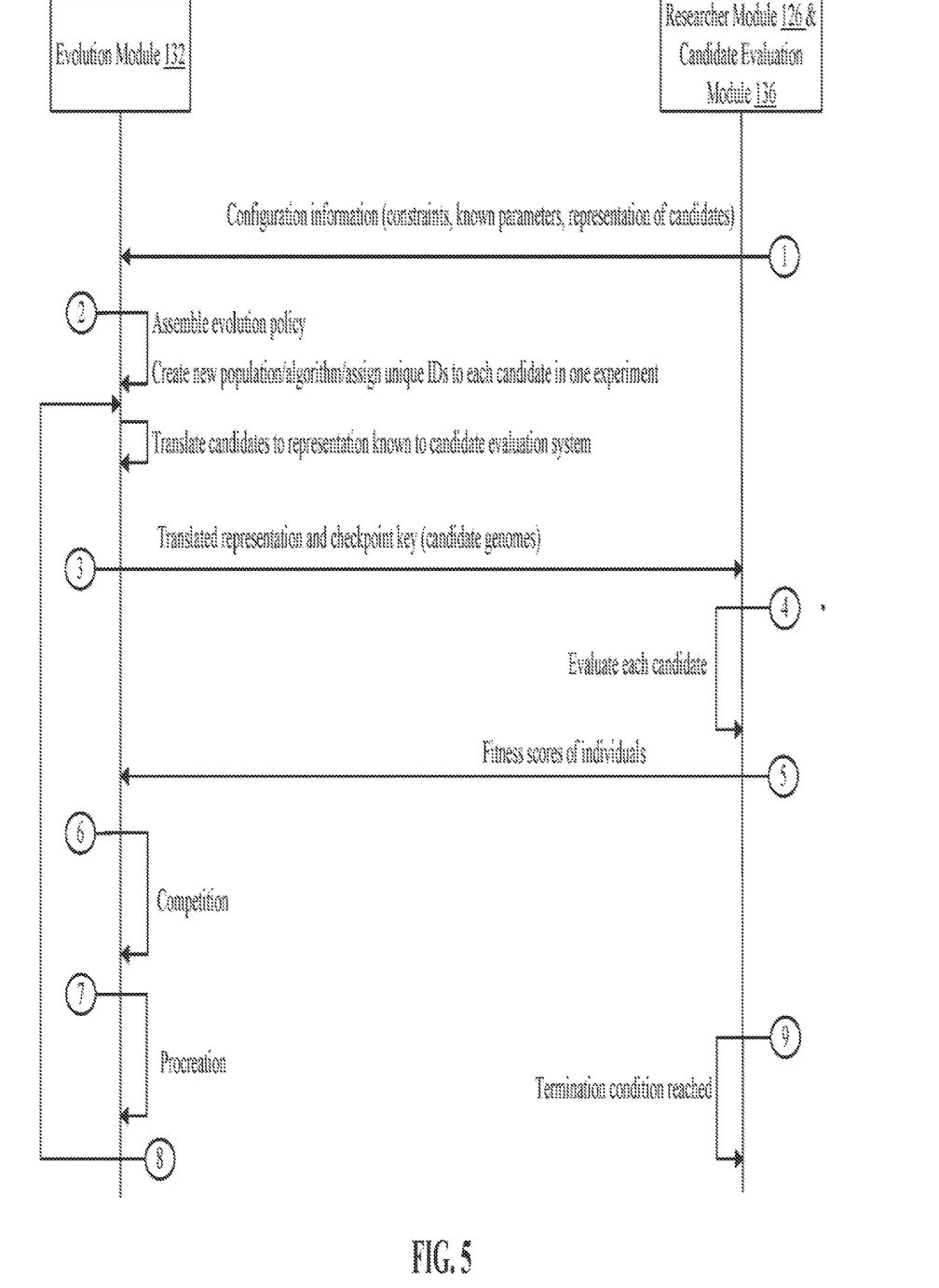
FIG. 5 illustrates and exemplary messaging flow in accordance with one or more embodiments herein.

FIG. 5 is a message sequence diagram illustrating the communication between the evolution module 132 and candidate evaluation module 134. As indicated above the module 126 is separated from the evolution module by a firewall 134 (not shown in FIG. 5) and all communication between these modules is encrypted. The researcher module 126 establishes communications with the evolution module 132 in a message 1 by sending configuration information to the evolution module 132. The evolution module 132 creates new population of individuals and new algorithm configurations. Individuals are assigned identifiers (IDs) that are unique at least amongst individuals in one experiment (message 2). The evolution module uses a translator to translate each instance of the genetic material into a representation known to the candidate evaluation module 136.

The translated representations along with a checkpoint key are sent to the candidate evaluation module 136 via a message 3. The candidate evaluation module, evaluates each individual against its data set in a secure environment (message 4). The candidate evaluation module 136 sends the fitness scores of individuals to the evolution module 132 (via the researcher module 126) in a message 5. The evolution module performs competition (message 6) and procreation (message 7). The above process is repeated via a message 8 until an experiment specific criteria is reached (message 9).

In a more detailed example of the messaging correspondence shown in FIG. 5, the researcher module initiates contact with evolution module by communicating configuration specification information regarding genetic material, variations and/or known parameters on algorithm, and selection of the representation by which the candidate evaluation module wishes to receive candidates, etc.

The evolution module accepts the configuration specification and creates a new population either originally or based on prior candidates (if any) and new algorithm configuration (if any). A tree structure is generated for representing the structure of candidate genomes. An evolution policy is generated using the received configuration specification for each node of the tree. Each member of the population is assigned a specific candidate identifier ID, unique (at least) amongst other candidates in the current experiment. Internal representation of the population is put through a selected translator which translates each instance of candidate genetic material into a representation known to the candidate evaluation module, each associated with its original candidate ID. A checkpoint key, unique to the current experiment and population, along with the translated representations and their associated candidate IDs are communicated back to the candidate evaluation module from the evolution module via the researcher module.

The candidate evaluation module receives the checkpoint key and the population from the evolution module by way of the researcher module, and evaluates each candidate genome of the population against its data set, in whatever secure environment is required (if any). The candidate evaluation module evaluates each candidate and records measurements of performance against the secure data set. The secure data set may be static or dynamic, e.g., such as where candidates are tested online against actual users.

When all evaluation is complete (as determined by the domain-specific aspects of the candidate evaluation module), candidate genome evaluation results associated with their candidate ID's are may be reported back to the evolution module via the researcher module with the previous checkpoint ID. If an experiment-specific termination criteria is reached based on the received evaluation results, then the experiment ends. Otherwise, the evolution module continues with creation of a new population and steps above are repeated.

At the evolution module, candidate genomes with fitness scores better than other candidate genomes in the population are selected via competition and a next generation of the population is evolved using selected candidate genomes. During the procreation process, the previously assembled evolution policy is applied to the selected candidate genomes surviving the competition. And the new population of candidate genomes is transmitted to the candidate evaluation module as described above. The process continues until a termination condition is reached.

The disclosed embodiments can use any specific representation of evolved material and keep the secure data and implementation properties as described above. In general, aspects of the embodiments can be used to optimize parameters of any system where the internals of the system are not known from the outside ('black box optimization'). In one such implementation, the technology disclosed is used to generate candidate Neural Networks via evolution.

In one example implementation, a similar service can be used to evolve anything from website GUI's, to motions of robots, shapes and properties of objects intended to be made physical at some later date.

In another example implementation, a similar service can be used to evolve parameters for statistically based interactive visual search systems.

Aspects of the embodiments can also apply to other population-based algorithms and population-based machine learning algorithms beyond evolution as well.

In addition to the description above and the previously incorporated patents and applications, the following documents are also incorporated herein by reference and are considered to be part of this disclosure, either explicitly in the case of patent applications or as supporting materials. The examples presented in the following incorporated applications and research papers illustrate situations in which aspects of the invention can be used. U.S.: Nonprovisional application Ser. No. 15/399,450 filed on Jan. 5, 2017, titled "Machine Learning Based Webinterface Production and Deployment System"; U.S. Nonprovisional application Ser. No. 15/399,523 filed on Jan. 5, 2017, titled "Webinterface Production and Deployment Using Artificial Neural Networks"; Golovin et. al., (2017) "Google Vizier: A Service for Black-Box Optimization," Proceedings of the 23rd ACM SIGKDD International Conference on Knowledge Discovery and Data Mining, pp. 1487-1495; Liang et. al., (2018) "Evolutionary Architecture Search for Deep Multitask Networks," arXiv: 1803.03745; Meyerson et. al., (2018) "Pseudo-task Augmentation: From Deep Multitask Learning to Intrastask Sharing- and Back," arXiv: 1803.04062; Rawal et. al., (2018) "From Nodes to Networks: Evolving Recurrent Neural Networks," arXiv: 1803.04439; Zhang et al., (2011) "Evolutionary Computation Meets Machine Learning: A Survey," IEEE Computational Intelligence Magazine, Vol. 6, No. 4, DOI 10.1109/MCI.2011.942584; and Bergstra et al., (2013) "Hyperopt: A Python Library for Optimizing the Hyperparameters of Machine Learning Algorithms," Proceedings of the $12^{th}$ Python in Science Conference (SCIPY 2013).

The invention claimed is:

1. A method for facilitating evolutionary optimization of candidate genomes in a desired domain, wherein evolution of the candidate genomes and evaluation of the candidate genomes with domain specific data are performed securely from each other, the method:
    receiving by an evolution module located in a first secure processing environment from a researcher module a configuration specification, wherein the researcher module automatically builds the configuration specification using defined rules;
    parsing the configuration specification by the evolution module into a tree structure of specific coded data structures;
    generating a policy assembly using the parsed tree structure of specific coded data structures to produce a representation tree of reproduction policy structures, wherein each instance of the reproduction policy structures represents one of a single leaf node or branch node in the representation tree;
    creating by the evolution module an internal representation of a candidate genome in accordance with the representation tree of reproduction policy structures, wherein the reproduction policy structures are datatype specific;
    translating by the evolution module the internal representation of the candidate genome to a known representation of the candidate genome, wherein the known representation of the candidate genome is known to a candidate evaluation module; and providing the known representation of the candidate genome to the candidate evaluation module located in a second secure processing environment for fitness evaluation in the desired domain.

2. The method of claim 1, wherein the evolution module creates a population of multiple candidate genomes and assigns a unique identifier to each of the multiple candidate genomes.

3. The method of claim 1, wherein the reproduction policy structures are selected from the group consisting of data-type-specific reproduction operations and interpretive operations of lists of random floating point and integer numbers.

4. The method of claim 1, wherein the evolution module creates the internal representation of a candidate genome using data from a previously generated candidate genome.

5. An evolution module in a first secure processing environment for generating populations of candidate genomes for evaluation by an independent candidate evaluation module located in a second secure processing environment in a specific domain, comprising:
  a parser module for
    receiving a configuration specification from a research module,
    parsing the configuration specification into a tree structure of specific coded data structures, and
    generating a policy assembly using the parsed tree structure of specific coded data structures to produce a representation tree of reproduction policy structures, wherein each instance of the reproduction policy structures represents one of a single leaf node or branch node in the representation tree; and further wherein the configuration specification is indicative of a known candidate genome representation that is recognizable to the independent candidate evaluation module; and
  a population initialization module for initiating the creation of an internal representation of a candidate genome in accordance with the representation tree of reproduction policy structures, wherein the reproduction policy structures are data-type specific;
  wherein the evolution module translates the internal representation of the candidate genome to the known representation of the candidate genome and provides the known representation of the candidate genome to the candidate evaluation module for fitness evaluation in the specific domain; and
  further wherein, evolution of the candidate genomes and evaluation of the candidate genomes in the specific domain are performed securely from each other.

6. The evolution module of claim 5, wherein the population initialization module assigns a unique identifier to each candidate genome.

7. The evolution module of claim 5, wherein the reproduction policy structures are selected from the group consisting of data-type-specific reproduction operations and interpretive operations of lists of random floating point and integer numbers.

\* \* \* \* \*